United States Patent

Watkinson et al.

[11] Patent Number: 5,805,207
[45] Date of Patent: Sep. 8, 1998

[54] MOVING IMAGE REPRODUCTION SYSTEM PROVIDING COMPENSATION FOR CINEMATOGRAPHIC ARTIFACTS

[75] Inventors: John Watkinson, Burghfield Common; Roderick Snell, Petersfield, both of United Kingdom

[73] Assignee: Snell & Wilcox, Ltd., Hampshire, United Kingdom

[21] Appl. No.: 536,731

[22] Filed: Sep. 29, 1995

[30] Foreign Application Priority Data

Sep. 30, 1994 [GB] United Kingdom .................. 9419777

[51] Int. Cl.⁶ ..................................................... H04N 7/18
[52] U.S. Cl. .............................................. 348/97; 348/699
[58] Field of Search .......................... 348/97, 402, 413, 348/416, 699; H04N 7/18

[56] References Cited

U.S. PATENT DOCUMENTS 4,873,573  10/1989  Thomas .................................... 348/416
4,890,160  12/1989  Thomas .................................... 348/429

FOREIGN PATENT DOCUMENTS 2188510  2/1987  United Kingdom .

*Primary Examiner*—Howard W. Britton
*Attorney, Agent, or Firm*—Lowe, Price, LeBlanc & Becker

[57] ABSTRACT

A cinematographic camera is operated at three times normal frame rates and converted to digital video in a telecine operation. Motion estimation provides from the digital video motion vectors which are substantially free of temporal aliasing. These motion vectors are employed in film weave measurement and correction and in motion compensated noise reduction and scratch concealment to provide a high quality signal which can be displayed at the elevated frame rate or standards converted, using the high quality motion vectors, to any desired standard.

11 Claims, 2 Drawing Sheets

MOVING IMAGE REPRODUCTION SYSTEM PROVIDING COMPENSATION FOR CINEMATOGRAPHIC ARTIFACTS

BACKGROUND OF THE INVENTION

This invention relates to the use of digital image processing technology between motion picture film and the display in order to reduce or eliminate the drawbacks of existing motion picture film technology.

The known methods of portraying moving images include film, television and computer generated graphics. Each of these has distinct origins with the result that there is substantial incompatibility between the systems. There is now an increasing requirement to merge image technologies under the common heading of multi-media. One simple and well established technique which serves to merge film and television technologies is the use of the telecine machine to convert motion pictures into television signals.

All known methods of portraying moving images suffer from defects in the accuracy of motion portrayal. This can be considered with reference to the optic flow axis which can be defined as the locus of a fixed point on some moving object as it moves in a three-dimensional space, where two of the dimensions are spatial and the third is temporal. If the reproduced optic flow axis is not substantially the same as the original then some motion artifact will be observable. In practical motion picture portrayal systems, the continuous time axis has to be sampled into discrete frames. Traditionally, the frame rates used have been selected not on the requirement for adequate motion portrayal, but merely on the requirement to reduce flicker.

Today's moving picture systems are designed around the assumption that sufficient static resolution and the avoidance of flicker are adequate criteria. It is the belief of the present inventors that a most important criterion is the provision of sufficient dynamic resolution. Conventional systems are regarded by the present inventors as having insufficient dynamic resolution with the consequence that they display considerable motion artifacts. As there are a number of different picture or frame rates in use in moving pictures, conversion between these rates become necessary. Unfortunately, this tends to amplify the severity of such motion artifacts. It is a goal of this invention to substantially eliminate such artifacts by providing suitable dynamic resolution.

It is quite common for motion picture film to be used as a capture medium for programs which will subsequently be shown on television systems. The contrast range which film will accept is greater than that of video cameras and so lighting is less critical. As there is currently some debate about the scanning standards to be used in future television systems a number of program makers are using film because it can be scanned into any number of television lines in the future. Where television programs are to be broadcast both in Europe and USA it is possible to produce using film and then to perform two separate telecine transfers to the relevant television standards.

Existing motion pictures are commonly made using a frame rate of 24 frames per second. This frame rate was arrived at because of mechanical restrictions in early cameras and projectors which no longer apply. Such a frame rate is inadequate for display purposes and all motion picture projectors alleviate, but do not solve, the problem by displaying each frame twice so that the audience apparently sees 48 images per second. This is satisfactory for Images in which there is little or no motion, but not satisfactory where substantial motion takes place. As will be described, the result of repeating frames is that an unwanted zero order hold process is superimposed on the optic flow axis. Moving objects appear to stop and start and this Is perceived as judder.

Existing television signals use the principle of interlace in which the odd numbered lines of a picture are presented in one field and the even numbered lines presented in a second field. In U.S.A., 60 fields per second is a standard, whereas in Europe 50 fields per second is normal.

When motion pictures are played on a telecine machine which is designed to output signals at 50 fields per second, the linear speed is changed so that the frame rate becomes 25 Hz. Two fields are then created from one frame of film. As a result the judder experienced on film projection is also present in the television display. In addition, the running time and the pitch of the accompanying soundtrack are both incorrect by a factor of four percent.

When a telecine machine is used to output 60 fields per second, the procedure is to produce three television fields from odd film frames and two television fields from even film frames. The result of this so called "3:2 pulldown" is that motion portrayal is even more seriously impaired. Moving objects do not move smoothly; but appear to move in a series of jumps of unequal size, pausing for unequal periods. However, the running time and audio pitch are not affected.

Whilst this artefact is irritating, an even greater problem arises if such 60 Hz 3:2 television signals are standards converted to 50 Hz. Even if high quality standards convertors incorporating motion compensation are used, the judder will be reproduced in the output.

Another drawback of existing motion pictures is that the mechanical positioning of the film frame in the camera suffers from an imprecision which cannot be eliminated. When the film is subsequently viewed an a projector, the positioning error of the projector is superimposed on that of the camera. The result is that the image is not steady but both moves vertically and laterally. The effect is still observed in a telecine machine except that the contribution of the telecine machine is smaller than the contribution from a projector.

It is a further drawback of motion picture film that it has a random structure known as grain which is superimposed on the image. In order to reduce the effect of grain, large film gauges are often used, with corresponding increases in cost.

Another drawback of motion picture film is that individual frames can be defective because of scratches or particles of dust or other debris which obscure the transmitted light.

SUMMARY OF THE INVENTION

It is an object of the present invention to provide improved apparatus and method which will substantially reduce or eliminate the above drawbacks of existing motion picture film when used as a source of television signals.

Accordingly, the present invention consists in a moving image reproduction system comprising a cinematographic film camera operable at an elevated frame rate; a telecine machine capable of deriving from the developed cinematographic film a sequence of digitised frames; a motion estimator serving to estimate the motion of objects between successive frames and thereby derive motion vector information; compensation means utilising said motion vector information to compensate in said sequence of digitised frames for cinematographic artifacts and display means for displaying the compensated frame sequence.

The objects of this invention can be achieved without incurring excessive film costs. Motion pictures made according to the method disclosed can be converted into television signals of any field rate without quality loss or motion artifacts. It is not necessary to know the subsequent television standard prior to filming as the system is truly standards independent. Grain, defects and positioning error can be reduced to the point where, in comparison with video, they are imperceptible.

Furthermore, a film made using a system according to the present invention can also be used in conjunction with display apparatus whose performance exceeds that of conventional television systems with a corresponding substantial increase in quality and motion portrayal accuracy.

DESCRIPTION OF THE PREFERRED EMBODIMENTS

Figure 1:
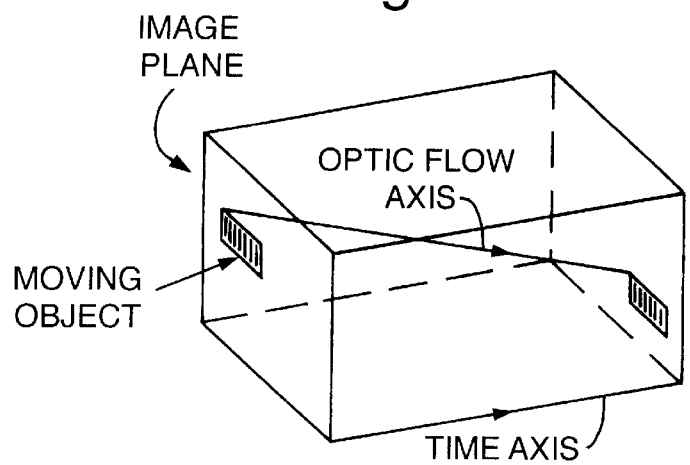
FIG. 1 is a diagram illustrating the optic flow axis of a moving object.
Figure 2:
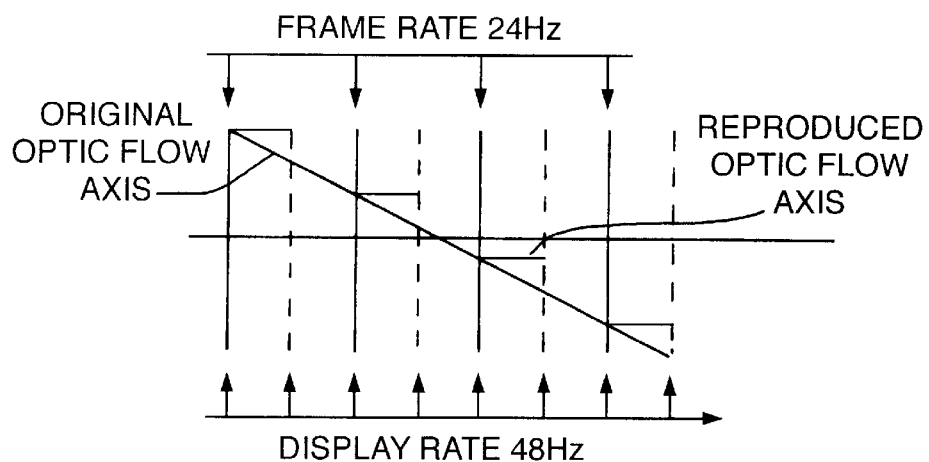
FIG. 2 illustrates graphically the reproduction of an optic flow axis in a conventional motion picture projector.
Figure 3:
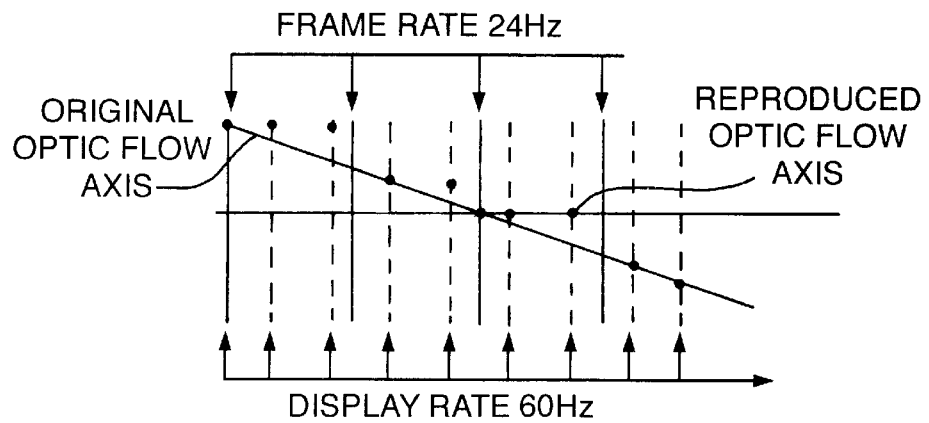
FIG. 3 illustrates similarly the reproduction of an optic flow axis in a NTSC telecine process.

As shown in FIG. 1, the optic flow axis can be defined as the locus of a fixed point on an object as it moves in space and time. FIG. 2 shows the effect of displaying each frame twice to produce a flicker-free 48 Hz display frequency. It will be seen that an unwanted zero order hold process is superimposed on the optic flow axis. Moving objects appear to stop and start and this is perceived as judder. A similar artifact arises in a PAL telecine operation. The effect on the optic flow axis of the above-described 3:2 pull down conventionally used in NTSC telecine, is depicted in FIG. 3. It will be observed tat objects do not move smoothly, but appear to move in a series of jumps of unequal size, pausing for unequal periods.

Figure 4:
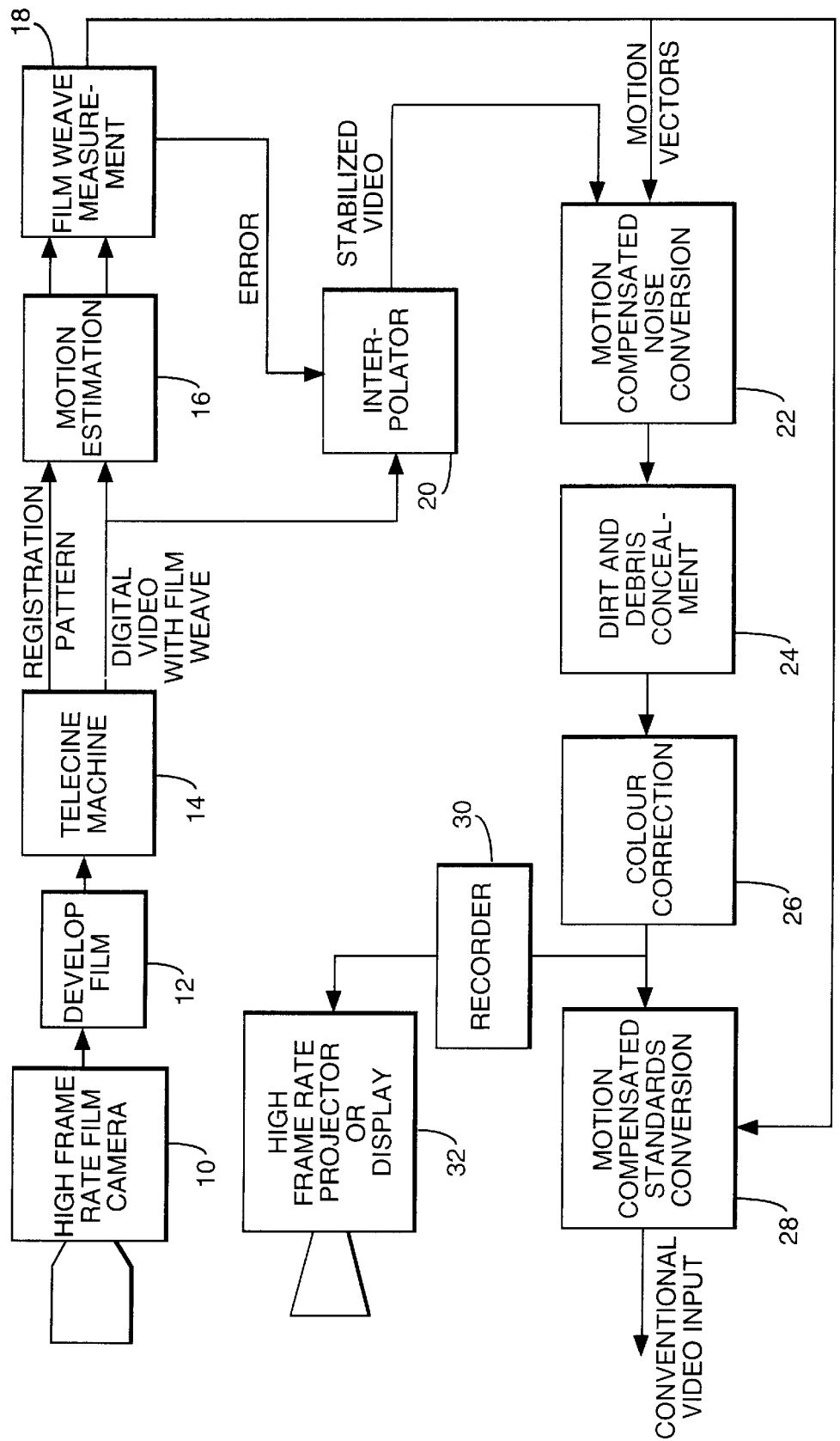
FIG. 4 illustrates in block diagram form an embodiment of the present invention.

One embodiment of the claimed apparatus is shown in FIG. 4. A moving picture film camera 10 is used, which has a frame rate substantially in excess of that used in normal cinematography. A frame rate of the order of 75 Hz is suitable but higher rates may also be used. A modern high resolution film may be used having a width typically but not restricted to 16 mm. The increased cost is filmstock arising from this elevated frame can be offset by the use of 16 mm film taking advantage of recent improvements in film resolution and speed.

Means may also be provided in the camera to expose a reference registration pattern adjacent to but outside the visible area of each frame in order that film weave or misregistration in the camera or in a subsequent reproduction device can be measured and remedied. Means may also be provided in the camera to expose an area of the film outside the visible part of the frame with a time code.

The film is developed at 10 in a conventional manner and may be reproduced on mechanical projectors or viewers of suitable design but advantages of the present invention are lost If this is done.

In accordance with the present Invention, the film is reproduced on a telecine machine 14 which is capable of producing digital electrical output signals which result from spatially sampling each image with an array of sampling sites, typically a fixed rectangular grid. Each spatial sample or pixel is described using some colour rendering system such as a different value for the red, green and blue components of the image or using a colour difference system. The spacing of the pixels in the telecine machine may advantageously be made substantially smaller than the spacing of pixels which is required in the final output of the system, ie. the principle of spatial oversampling may be used.

If the film is of the type which carries reference registration or time code patterns, the telecine machine must also be capable of including said patterns in the area of the film sampled.

The digital electrical output of the telecine machine is sent to a unit which is capable of performing a number of processes.

Firstly, a motion estimation system 16 which receives the digital video signal from the telecine, together with any registration pattern information compares a suitable number of successive images in order to determine the optic flow axes for all significant moving objects in the images from the film. An advantageous known method of measuring such motion is the technique of phase correlation as disclosed in U.S. Pat. No. 4,890,160 and British Patent No. 2,188,510 each of which is hereby incorporated by reference. However, any suitable means may be employed. The output of the motion estimation system is used in a large number of subsequent processes and its performance is critical to the overall system performance.

The success of any motion compensated process is limited by the accuracy of motion estimation. In conventional systems having low frame rates this is poor because the source pictures are temporally undersampled and contain significant amounts of aliasing on real material. In the claimed system the high capture frame rate minimises temporal aliasing and results in extremely accurate motion estimation so that the subsequent motion compensated process can operate optimally.

If a statistical analysis of the optic flow axes of all significant moving objects is carried out in film weave measurement unit 18, it will be found that a common component in all of them is due to the sum of film weave or misregistration in the camera and in the telecine machine. Alternatively or additionally analysis of the registration patterns can be used to measure the displacement of each image on the film from the ideal location.

The registration error which is a two dimensional parameter is used to shift the frames in a suitable digital interpolator 20 in such a way that the registration error is cancelled thereby eliminating the effects of film weave. An interpolator having a phase-linear finite impulse response would be suitable. Additionally the distortions of the optic flow axes due to weave are subtracted to obtain optic flow axes which accurately reflect the original moving image. Subsequently each pixel in the stabilised image is assigned a motion vector which describes the direction and magnitude of its motion.

The stabilised image and its motion vectors next pass to a noise reduction unit 22 which is designed to reduce the effects of film grain and contamination. It is known that the grain pattern on successive frames in a film is random and so it can be cancelled out by adding successive frames. However, in the presence of motion this causes multiple images or blurring. In the claimed system the grain reduction process is performed using motion compensation so that the averaging takes place along the axes of optic flow relative to which areas of the image are stationary. In conventional film grain reduction the degree of rejection of grain is limited by the low frame rate and by artifacts of excessive averaging whereas in the claimed system the high frame rate allows averaging over a larger number of frames and the accurate motion estimation allows the motion compensation to be more effective.

Means 24 are also be provided separately from the grain reduction process to reduce the effect of film contamination. Using the motion vectors it is possible to analyse the brightness of a given point on a moving object over many successive frames. Owing to the high frame rate this would ordinarily change by a moderate amount from frame to frame excepting the case of an edit. However a significant change lasting for one frame followed by a return to the previous value would be indicative of debris or scratching of the film. A suitable process such as that performed would replace the would replace the suspect pixel value in a frame with values from the same object in an adjacent frame or from a nearby part of the same frame thus effectively concealing debris. With conventional frame rates such processes are confused by genuine changes between frames resulting from subsampling on the time axis.

Following the grain and contamination reduction process a known colour correction stage 26 is provided. The dynamic range of the film is adapted to the dynamic range of the subsequent output video standard and the effects of the colour primaries of the film and the colour temperature at the time of filming are matched to the primaries of the video display to be used.

Finally, a motion compensated standards conversion process block 28 may be employed to convert from the high frame rate and pixel density of the digitized film to any required television standard, progressive or interlaced. Conversion of the picture aspect ratio may also be performed at this stage if required. In motion compensated standards conversion linear interpolation takes place not along the time axis, since this causes multiple images, but along the axes of optic flow.

The resulting output is free from film judder, grain, weave and debris and will have a quality restricted by the capabilities of the television output signal.

Alternatively, the output of the digital processor could be taken before the standards conversion and digitally recorded at the original frame rate in block 30 with or without the use of data reduction or compression means. Upon reproduction, a high bandwidth television projector 32 running at the capture frame rate would deliver a moving picture whose freedom from artifacts and accuracy of motion portrayal represents a substantial improvement over the prior art.

What we claim is:

1. Moving image reproduction system comprising a cinematographic film camera operable at an elevated frame rate; a telecine machine capable of deriving from the developed cinematographic film a sequence of digitised frames; a motion estimator serving to estimate the motion of objects between successive frames and thereby derive motion vector information; compensation means utilising said motion vector information to compensate in said sequence of digitised frames for cinematographic artifacts and display means for displaying the compensated frame sequence.

2. A system according to claim 1, wherein said compensation means comprises noise reduction means serving to average successive frames in accordance with said motion vector information.

3. A system according to claim 1, wherein said compensation means comprises film dirt concealment means serving to median filter successive frames in accordance with said motion vector information.

4. A system according to claim 1, comprising motion compensated standards conversion means serving to convert said compensated frame sequence, in accordance with said motion vector information, to a predetermined television standard.

5. A system according to claim 1, wherein the picture element size used in the production of digitised frames by the telecine is substantially less than the picture element size used in the display.

6. A system according to claim 1, wherein the film camera is operable at a frame rate of at least 48 frames per second.

7. A system according to claim 6, wherein the film camera is operable at a frame rate of at least 72 frames per second.

8. A system according to claim 1, wherein said compensation means comprises film weave compensation means serving to compensate for spurious movement of the cinematographic film.

9. A system according to claim 8, wherein the camera is adapted to expose a registration pattern on the film outside the image area, the film weave compensation means comprises film weave measurement means serving through monitoring of said registration pattern to produce film weave information and interpolation means operable on said sequence of digitised frames in response to said film weave information to compensate for film weave.

10. A system according to claim 8, wherein the film weave compensation means comprises film weave measurement means serving through processing of said motion vector information to produce film weave information and interpolation means operable on said sequence of digitised frames in response to said film weave information to compensate for film weave.

11. A system according to claim 10, further comprising means for correcting said motion vector information in response to said film weave information.

* * * * *